United States Patent Office 3,228,977
Patented Jan. 11, 1966

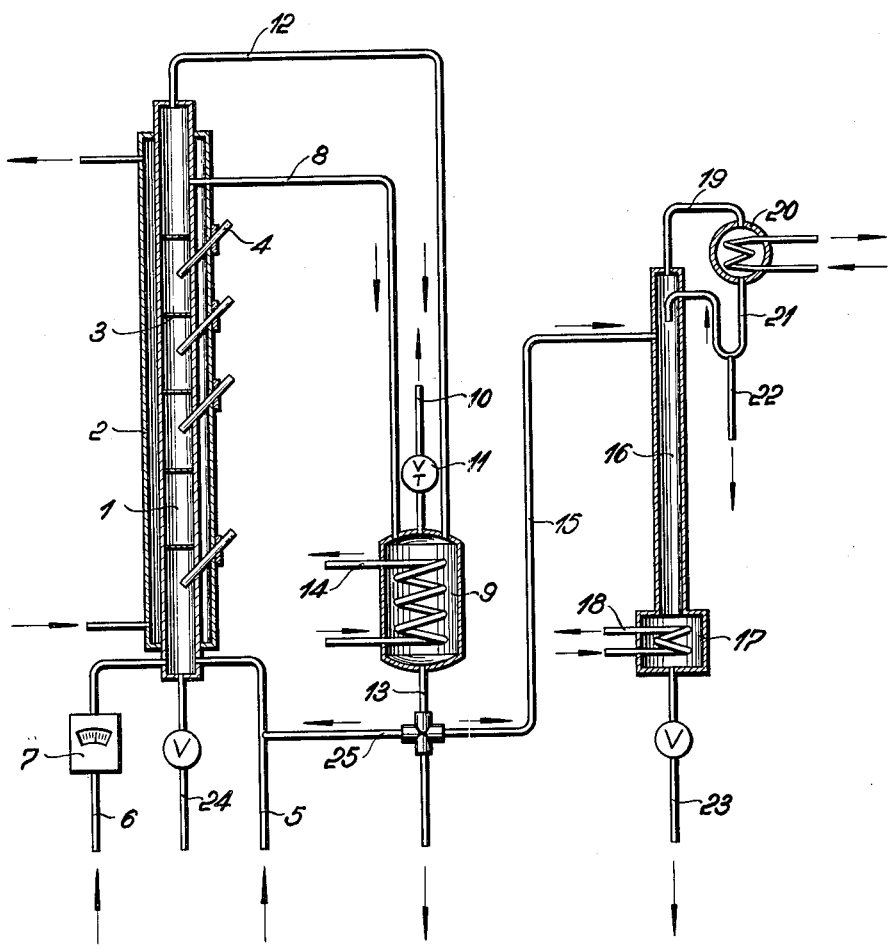

3,228,977
PROCESS FOR THE MANUFACTURE OF SATURATED ALIPHATIC PERCARBOXYLIC ACIDS
Kurt Sennewald, Knapsack, near Cologne, Klaus Born, Hermulheim, near Cologne, and Heinrich Rehberg, Efferen, near Cologne, Germany, assignors to Knapsack-Griesheim Aktiengesellschaft, Knapsack, near Cologne, Germany, a corporation of Germany
Filed Feb. 26, 1963, Ser. No. 261,164
Claims priority, application Germany, Mar. 8, 1962, K 46,108
5 Claims. (Cl. 260—502)

The present invention relates to a process for the manufacture of organic solutions of saturated aliphatic percarboxylic acids by catalytically oxidizing aldehydes with gaseous oxygen or an oxygen-containing gas.

It is known that percarboxylic acids can be prepared by oxidizing a corresponding aldehyde by means of oxygen or air in the presence of a heavy metal salt, which is ordinarily used in a concentration within the range of 0.005 to 2% by weight, the oxidation being carried out at a relatively low or at an elevated temperature and, if desired, with the application of pressure. This process is generally carried out while using a dilute solution of the aldehyde, the solvents employed being characterized by the common feature of having a boiling point which is below that of the resulting peracid or below that of the carboxylic acid obtained as a by-product during the oxidation of the aldehyde. The proposed solvents include saturated aliphatic carboxylic acids or their esters with monohydric alcohols, as well as ketones or hydrocarbons. A dilute aldehyde solution has to be used since unreacted aldehyde otherwise reacts further with heat formation with the peracid already formed to yield an aldehyde monoperacylate, which is even less stable than peracid and readily decomposes, especially in the presence of heavy metals.

The instability of peracids in the presence of heavy metals also restricts the possible concentration of peracid solutions without decomposition taking place by distillation or fractionation, since all the solvents previously used have a boiling point below that of the percarboxylic acid or below that of the carboxylic acid obtained as a by-product, so that on concentrating the peracid it is always obtained in concentrated form in admixture with heavy metals which provoke the decomposition of the peracids. The degree to which and the velocity with which the peracid decomposes depend on the nature and concentration of the heavy metal salt and on the temperature of the peracid solution.

U.S. Patent application Serial No. 818,840 filed June 8, 1959 now abandoned, describes a process for reducing the liability of peracids to decompsoition due to heavy metals, wherein merely traces of heavy metal salts are used for catalytically accelerating the oxidation of the aldehyde, the catalyst being used in a concentration of at 0.001% by weight. In order to produce a sufficient oxidation velocity with such catalyst concentration, it is necessary to carry out the oxidation at a temperature within the range of about 20 and 50% C. and optionally with the application of pressure. In this process, it is disadvantageous that with a catalyst concentration of less than 0.001% by weight the initiating reaction of the aldehyde oxidation starts irregularly or at least proceeds irregularly. The resultant retarded oxidation reaction which gives rise to a reduced aldehyde conversion per unit of time, is disadvantageous especially in continuous operation, where the residence time of the reaction mixture in the oxidation zone is limited. Furthermore, in spite of the minor catalyst concentration, the peracid solution obtained in the above process is impossible to store for a prolonged time without the peracid being decomposed due to the presence of the catalyst, and the decomposition is even considerably accelerated when concentrated peracids are prepared due to increased catalyst concentrations.

All the aforesaid disadvantages are eliminated by the process of the present invention which uses appropriate means and thereby enables the initiating reaction of the aldehyde oxidation to be considerably accelerated and the total reaction time thereby shortened and, moreover, a peracid solution stable for a prolonged time to be prepared.

The present invention provides a process for making organic solutions of saturated aliphatic percarboxylic acids, wherein a solution of corresponding aldehyde in an inert solvent is treated at a temperature within the range of about 0 and about 50° C., preferably within the range of about 20 and 50° C. and, if desired, under pressure, with at least the molar amount of gaseous oxygen or an oxygen-containing gas in the presence of a heavy metal catalyst, for example an iron, cobalt or manganese salt, which is preferably added in a proportion of at most 0.001% by weight, calculated on the aldehyde, and the aldehyde solution is admixed with a small amount of a peroxide compound before the oxygen is added. The peroxide compound is advantageously the peracid which is formed during the oxidation of the aldehyde. The peroxide compound is dissolved in the aldehyde solution in a proportion of at most about 1% by weight, calculated on the aldehyde used. The aldehyde should be used in a maximum concentration of 25% by weight, calculated on the total starting mixture, so as to ensure a complete conversion of aldehyde and oxygen.

The inert solvents used for dissolving the aldehyde include esters, ketones and hydrocarbons which may be used along or in combination. The preferred ester solvents are those of the carboxylic acids which are obtained as the by-product of the aldehyde oxidation. The alcoholic components of the ester is a monohydric or dihydric alcohol, for example methanol, ethanol, ethylene glycol, diethylene glycol, propylene glycol or glycerol. It is also advantageous to use solvents which boil at a higher or lower temperature than the peracid and enable concentrated peracid solutions to be prepared without difficulty, if desired. The boiling point of the peracid advantageously should differ from that of the particular solvent used by at least about 30 centigrade degrees.

The low-boiling solvents include more especially acetone, methylethyl ketone and the acetic acid methyl or ethyl ester, while the preferred high-boiling solvents include ethylene glycol diacetate, diethylene glycol diacetate, propylene glycol diacetate and glycerol triacetate.

When the oxidation is carried out under pressure, it is advantageous to use a pressure within the range of about 0.5 and about 15 atmospheres, preferably within the range of 1 and 8 atmospheres (gauge pressure).

The concentrated peracid solutions are prepared in known manner by expelling the solvent in vacuo if the solvent boils at a lower temperature than the peracid. Alternatively, when the solvent boils at a higher temperature than the peracid, for example diethylene glycol diacetate, it is necessary to admix the aldehyde solution before its oxidation with an additional solvent boiling at a lower temperature than the peracid, and to expell the resulting peracid together with the lower-boiling solvent. Since in this working method the catalyst is retained in the distillation residue, there are obtained as the distillate catalyst-free peracid solutions which are stable for a prolonged time and the peracid concentration of which is determined by the proportion of the low-boiling solvent.

Dilute or concentrated peracid solutions containing small residual amounts of catalyst are advantageously stabilized against decomposition by means of a stabilizer which improves the storability of these solutions.

It is already known that acetaldehyde monoperacetate can be stabilized by admixing therewith an organic phosphate salt of the formula $Na_5(2\text{-ethylhexyl})_5(P_3O_{10})_2$, but this stabilizer is not readily accessible and therefore unsuitable for use in a technical scale process.

It is a further embodiment of the process of the present invention to stabilize percarboxylic acid in their solutions with the aid of chemically simple and readily available compounds in order thereby considerably to improve the stability of these solutions. As suitable stabilizing compounds there may be used more especially the sodium and ammonium salts of orthophosphoric acid or polyphosphoric acid, the ammonium salts being preferred due to their better solubility. N,N'-diethyl-dithiocarbamic acid may also be used as an appropriate stabilizer. In order to produce a sufficient stabilizing effect, the stabilizer is added in a proportion of at most 0.1% by weight, calculated on the peracid solution. The incorporation of the aforesaid stabilizers results in the peracid solutions obtained by the process of the present invention losing not more than half of their initial active oxygen content after about 100 days at 22° C. If no stabilizer were added, the same peracid solution would be decomposed to an extent of 50% after as little as 20 days. The stabilization of peracid solutions is especially advantageous in the manufacture of concentrates by expelling the solvent for the reason that during the concentration step the catalyst concentration increases steadily so that the decomposition of the peracid is accelerated. In order to inactivate the catalyst, the peracid is therefore first admixed with one of the stabilizers mentioned above before it is concentrated.

An apparatus suitable for use in carrying out the process of the present invention is shown diagrammatically in the accompanying drawing.

Referring to the drawing.

A tubular reactor 1 surrounded by a cooling jacket 2 and with sieve plates 3 disposed in its reaction zone is charged under pressure through line 5 with the aldehyde and catalyst solutions, which are reacted with oxygen or an oxygen-containing gas introduced into reactor 1 through line 6 and flow meter 7. The thermometers 4 disposed at various positions of reactor 1 are intended for measuring the temperature in the reaction zone. The peracid solution obtained in the course of the reaction is removed through overflow line 8 and conveyed to the intermediate container 9 provided with a cooling means 14. The gases or gaseous products escaping at the head of reactor 1 are conveyed through line 12 to the intermediate container 9, while uncondensable matter is removed through line 10 in which a throttling valve 11 is disposed. The cooled, dilute peracid solution can be eliminated through line 13 for further treatment or use, but a small portion of the solution is previously branched off and returned through lines 25 and 5 to reactor 1.

In order to prepare a catalyst-free or concentrated peracid solution, the dilute peracid solution stored in the intermediate container 9 is introduced through lines 13 and 15 into the upper portion of a fractionating column 16 and distilled therein by fractionation in vacuo. The gaseous head product flowing off through line 19, which merely consists of the readily-boiling solvent when concentrated peracid solutions are being prepared, is liquefied in condenser 20 and a portion of the solvent so liquefied is returned as reflux through line 21 to column 16, while the bulk thereof is removed through line 22. The peracid-containing concentrate is removed from the still 17 through line 23, the still 17 being equipped with a heating means 18. When a catalyst-free solution is prepared, the solution is removed at the head of column 16, while the high-boiling solvent together with the catalyst, which may be both returned to reactor 1 and used again, is retained in still 17. The reactor 1 may be discharged through line 24.

The apparatus described above may be used for continuous and for discontinuous operation.

The following examples serve to illustrate the invention, but they are not intended to limit it thereto:

*Example 1*

3.6 kg./hr. of a 14% acetaldehyde solution containing $2.8 \cdot 10^{-5}$ mol/liter ferric chloride were introduced into the lower portion of an absorption tower having a capacity of 2.5 liters. The solvent was acetone. The absorpiton tower which served as the reactor was charged under a pressure of 1 atmosphere (gauge pressure) with such an amount of oxygen that a small excess proportion thereof escaped from the column. The off-gas emanating from the reactor was composed as follows:

| | Percent |
|---|---|
| $O_2$ | 84.6 |
| $CO_2$ | 10.5 |
| $CH_4$ | 3.2 |
| $CH_3 \cdot CHO$ | 0.01 |
| $(CH_3)_2CO$ | 0.04 |

The reactor was cooled and the temperature in the reaction zone thereby maintained at 38° C. 1% of the product withdrawn continuously from the reactor through an overflow was cycled and admixed with the aldehyde solution so that the aldehyde solution already contained small amounts of peracid when it underwent reaction with the oxygen. The reaction mixture thus exhibited already after 3 hours an almost constant peracetic acid content of 17% by weight. When peracetic acid was not added to the aldehyde solution, the above-indicated peracetic acid content was only reached after about 24 hours. The product withdrawn continuously from the reactor was admixed with 0.1% ammonium tripolyphosphate and was then directly used, for example, for the epoxidation of unstaturated compounds.

The analysis indicated that the aldehyde used was converted as follows:

77.5% into peracetic acid
3.0% into acetaldehyde monoperacetate
17.5% into acetic acid and acetic anhydride
2.0% into gaseuos by-products, especially $CO_2$ and $CH_4$ Peracetic acid of higher concentration, for example, for use in the epoxidation of unsaturated compounds was obtained as follows: the stabilized product leaving the absorption tower was conveyed to a distilling column operated under a pressure of about 100 mm. mercury, distilled therein and a product distilling over at a temperature between 8 and 10° C., which substantially consisted of acetone, was removed. The enriched peracetic acid solution containing 35% peracetic acid was removed continuously from the still in the sump of the distilling column.

The yield, calculated on the peracetic acid used, amounted to 98%, with the proviso that the residence time of the product in the still of the distilling column was at most 5 minutes.

*Example 2*

A reactor having a capacity of 4 liters was charged, per hour, with 5 kg. of a 15% solution of acetaldehyde in methylacetate, which shortly before its being introduced into the reactor, had been admixed with such an amount of a 0.01% ferro-acetate solution that the catalyst concentration was $1.5 \cdot 10^{-5}$ mol/liter. The reactor was also supplied in continuous manner with such an amount of oxygen that 2 mols oxygen were present per mol aldehyde. The oxygen not consumed and the off-gas were continuously released through a throttling valve and the pressure at the outlet side of the apparatus thereby maintained at 4 atmospheres (gauge pressure). 1% of the reaction mixture removed continuously was returned to the reactor and added to the aldehyde solution. The temperature was maintained at about 40° C. by water cooling.

The product removed in continuous manner was stabilized with 0.1% sodium salt of N,N'-diethyl-dithiocarbamic acid and then stored at temperatures below 15° C. until its intended use. The peracetic acid solution obtained in the manner described above had a concentration of 18%. 75% of the aldehyde underwent conversion into peracetic acid, 4% into acetaldehyde monoperacetate and 19% into acetic acid and acetic anhydride.

The loss of material amounted to 2%, calculated on the aldehyde used.

Example 3

10 kg. of a mixture consisting of 1 part by weight acetaldehyde and 5 parts by weight acetone containing 0.2% peracid were introduced, per hour, into a bubble column reactor having a capacity of 5 liters. At the same time, the reactor was charged, per hour, with 280 cc. of a catalyst solution consisting of 1.1 grams $FeCl_3$ in 10 liters acetone. The oxidation was carried out by forcing a continuous current of commercially pure oxygen under a pressure of 4.5 atmospheres gauge pressure) into the reactor, which was rapidly absorbed in a vivid reaction. Depending on the absorption velocity of the reaction mixture, the oxygen was added in such an amount that a small excess thereof, which may be as small of 1%, was released from the reactor. The temperature was maintained at 40° C. by means of a cooling device disposed in the reactor.

A reaction mixture free from acetaldehyde was continuously removed from th ereactor and analyzed. The following quantities were obtained:

| | Percent by weight |
|---|---|
| Free peracetic acid | 20.3 |
| Acetaldehyde monoperacetate | 0.8 |
| Acetic acid and acetic anhydride | 3.1 |
| Acetone | 85.8 |

The acetaldehyde was thus converted as follows:

80% by weight into peracetic acid
4% by weight into acetaldehyde monoperacetate
15% by weight into acetic acid and acetic anhydride.

The crude product so obtained was stabilized with 0.05% by weight diethylamine salt of polyphosphoric acid and then stored at room temperature without decomposition until its intended use.

Example 4

3.5 kg. of a solution of 6 kg. acetaldehyde in 36 kg. acetone were pumped, per hour, into an absorption column having a capacity of 2.5 liters. The absorption column was also supplied continuously, per hour, with 100 cc. of a manganese acetate solution in acetone containing a small amount of glacial acetic acid. The concentration of the manganese acetate solution was so adjusted that the absorption column contained $4 \cdot 10^{-6}$ mol/liter manganese salt. The absorption column was also charged with such an amount of 96% oxygen that the off-gas escaping from the absorption tower contained 80% oxygen and that the pressure in the colmun was at 8 atmospheres (gauge pressure). The absorption tower was cooled and its temperature thereby maintained at 45° C. A product composed as follows was continuously removed from the absorption column:

| | Percent by weight |
|---|---|
| Peracetic acid | 14.4 |
| Acetaldehyde monoperacetate | 0.7 |
| Acetic acid and acetic anhydride | 3.7 |

Immediately after its removal from the absorption column, the product was stabilized with 0.05% by weight ammonium polyphosphate and concentrated in a circulating air evaporator in vacuo under a pressure of 300 mm. mercury to a peracetic acid content of 25% by weight. The peracetic acid so produced lost about half its active oxygen after about 100 days at 22° C.

The acetone recovered and unreacted acetaldehyde were admixed with a fresh amount of acetaldehyde and then introduced again into the absorption tower.

In a single passage, 65% of the aldehyde used underwent conversion into peracetic acid. The oxidation and distillation yielded 94% by weight peracetic acid and acetic acid calculated on the aldehyde used.

Example 5

5 kg. of a mixture of 7 parts by weight anhydrous propionaldehyde, 35 parts by weight anhydrous acetone and 0.4 part of the peracid containing crude peroduct obtained in the test described below were introduced, per hour, into an absorption column having a capacity of 4 liters. Immediately before entering the absorption column, the above mixture was further admixed with 50 cc./hr. of a solution of cobalt chloride in acetone, the cobalt chloride content in the solution being $1 \cdot 10^{-5}$ mol/liter. The column was maintained under a pressure of 12 atmospheres (gauge pressure) and at a temperature of 45° C. and charged with such an amount of oxygen that 50 liters/hr. off-gas could be removed through an outlet valve. A product containing

| | Percent |
|---|---|
| Perpropionic acid | 16 |
| Peroxides | 0.5 |
| Propionic acid | 4.2 | was continuously withdrawn from the column. 1% of the product was added to the initial reaction mixture. The aldehyde was converted as follows:

69% into perpropionic acid,
3% into peroxides and
21% into propionic acid.

The crude peracid was directly used for epoxidation, respectively concentrated in simple manner after having been stabilized with 0.1% ammonium phosphate.

Example 6

The lower portion of a tubular reactor disposed in vertical position whose total capacity of 6 liters when empty was filled under the operating conditions with 3 liters of a liquid phase, was charged, per hour, with a mixture of

| | kg. |
|---|---|
| Acetaldehyde | 2.38 |
| Methylethylketone | 3.72 |
| Diglycol diacetate | 3.9 | with a catalyst solution of

| | kg. |
|---|---|
| Methylethylketone | 0.216 |
| $FeCl_3$ | 0.0306 | an initiator solution of 0.117 kg. crude peracetic acid containing 27% peracid, and with a gas mixture composed of
1.25 normal cubic meters (measured at N.T.P.) oxygen
0.04 normal cubic meter (measured at N.T.P.) nitrogen.

The reactor was cooled to ensure that the temperature in the lower half of the reactor did not exceed 42° C. The temperature in the upper half of the reactor was maintained at 36–38° C. The pressure prevailing in the reactor was adjusted to 6 atmospheres absolute.

The resulting crude product was withdrawn at the upper end of the tubular bubble column reactor and cooled in an intermediate container to +10° C. The gaseous by-products which had formed, a small amount of oxygen and the nitrogen contained in the oxygen supplied were withdrawn from the intermediate container, i.e. in the following proportions:

0.04 normal cubic meter oxygen
0.04 normal cubic meter nitrogen
0.001 kg. methylethylketone and
0.0048 kg. $CO_2$ and $CH_4$.

Of the liquid phase in the intermediate container 0.117 kg. were returned to the reactor while the remaining 11.735 kg. of the liquid reaction mixture were introduced into a distilling column in which the peracetic acid together with the acetic acid formed as a by-product and the more readily boiling constituent of the solvent mixture was expelled by distillation. Diglycol diacetate boiling at 255° C. at atmospheric pressure was obtained as the sump product. It contained the catalyst necessary to promote the peracid formation and could be returned to the reactor. At the head of the distilling column there were removed, per hour:

|  | kg. |
|---|---|
| Peracetic acid | 3.07 |
| Acetic acid | 0.79 |
| Methylethylketone | 3.935 |

The product obtained was free from catalyst which impairs its further use and displays a decomposing effect and it was also free from acetaldehyde monoperacetate which renders the manipulation of the peracid solution difficult.

The distillation was carried out in vacuo under a pressure of 100 mm. mercury so as to avoid noteworthy losses of material. A calculation of the yield showed that 5% of the active oxygen was lost during the distillation. 79% of the aldehyde used were converted into peracetic acid and 20% thereof were oxidized into acetic acid. 1% of the aldehyde was lost. When the peracetic acid is used, for example, for the preparation of distillable, low-boiling epoxides, such as propylene oxide, butylene oxide or the like, it is recommended to use the crude peracid for the epoxidation of the corresponding olefins and then to subject the epoxide-containing mixture to distillation.

We claim:

1. In the process for preparing organic solutions of saturated aliphatic percarboxylic acids by oxidizing a solution of a corresponding aldehyde in an inert solvent with at least the molar proportion of gaseous oxygen in the presence of a heavy metal catalyst at temperatures within the range of between about 0° C. and about 50° C., the improvement of oxidizing the aldehyde dissolved in at least one inert solvent selected from the group consisting of ester, ketones and hydrocarbons with gaseous oxygen in the presence of a peracid corresponding to the aldehyde reactant in a proportion of at most about 1% by weight calculated on the aldehyde used, the peracid being added before the aldehyde is oxidized with the oxygen.

2. The process of claim 1, wherein the solvent has a boiling point lower than the peracid, the boiling points of the solvent and the peracid differing from one another by at least 30 centigrade degrees.

3. The process of claim 2, wherein the solvent boiling at a temperature lower than the peracid is at least one substance selected from the group consisting of acetone, ethyl acetate, methyl acetate and methylethylketone.

4. The process of claim 1, wherein the aldehyde is oxidized in a solvent mixture comprising a component boiling at a temperature higher than the peracid and a component boiling at a temperature lower than the peracid, and the resulting peracid is removed together with the component boiling at a temperature lower than the peracid from the solvent mixture with the resultant formation of a catalyst-free peracid solution.

5. The process of claim 4, wherein the solvent boiling at a temperature higher than the peracid is at least one substance selected from the group consisting of ethylene glycol diacetate, diethylene glycol diacetate, propylene glycol diacetate and glycerol triacetate.

References Cited by the Examiner

UNITED STATES PATENTS

| Re. 25,057 | 10/1961 | Stevens | 260—502 |
| 2,347,434 | 4/1944 | Reichert et al. | 260—502 |
| 2,590,856 | 4/1952 | Greenspan et al. | 260—502 |
| 2,877,266 | 3/1959 | Korach | 260—502 |

FOREIGN PATENTS

| 864,803 | 4/1961 | Great Britain |
| 117,580 | 7/1958 | U.S.S.R. |

LORRAINE A. WEINBERGER, *Primary Examiner.*

LEON ZITVER, *Examiner.*